(12) United States Patent
Franklin et al.

(10) Patent No.: US 10,946,916 B1
(45) Date of Patent: Mar. 16, 2021

(54) ASSISTED SPRING SEAT HEIGHT OPTIMIZATION LIFT

(71) Applicants: Benjamin Curtis Franklin, Plant City, FL (US); Travis Lee Kempf, Sarasota, FL (US); Ryan Patrick Murphy, Parrish, FL (US); Joel Martin Kummer, Lakeland, FL (US); Myles Christian Waiters, Palmetto, FL (US); Daniel James Bumiller, Seminole, FL (US)

(72) Inventors: Benjamin Curtis Franklin, Plant City, FL (US); Travis Lee Kempf, Sarasota, FL (US); Ryan Patrick Murphy, Parrish, FL (US); Joel Martin Kummer, Lakeland, FL (US); Myles Christian Waiters, Palmetto, FL (US); Daniel James Bumiller, Seminole, FL (US)

(73) Assignee: University of South Florida, Tampa, FL (US)

( * ) Notice: Subject to any disclaimer, the term of this patent is extended or adjusted under 35 U.S.C. 154(b) by 365 days.

(21) Appl. No.: 16/058,058

(22) Filed: Aug. 8, 2018

Related U.S. Application Data (60) Provisional application No. 62/542,486, filed on Aug. 8, 2017.

(51) Int. Cl.
  *B62J 1/06* (2006.01)
  *B62J 1/08* (2006.01)
  *B62M 1/14* (2006.01)
  *B62K 3/00* (2006.01)

(52) U.S. Cl.
  CPC . *B62J 1/06* (2013.01); *B62J 1/08* (2013.01); *B62K 3/005* (2013.01); *B62M 1/14* (2013.01); *B62J 2001/085* (2013.01)

(58) Field of Classification Search
  CPC ... B62J 1/06; B62J 1/08; B62K 3/005; B62M 1/14; A61G 5/1059; A61G 5/026; A61G 5/023; A61G 5/0858; B66F 7/065
  See application file for complete search history.

(56) References Cited

U.S. PATENT DOCUMENTS

| | | | |
|---|---|---|---|
| 5,826,897 A * | 10/1998 | Beard | A61G 5/023 280/250.1 |
| 5,853,184 A | 12/1998 | Lofgren et al. | |
| 6,352,274 B1 | 3/2002 | Redman | |
| 7,530,932 B2 | 5/2009 | Lofgren et al. | |
| 7,722,071 B1 | 5/2010 | Lofgren et al. | |
| 8,888,070 B2 * | 11/2014 | Olesen | A61G 5/1059 254/9 C |
| 9,504,618 B2 * | 11/2016 | Lykkegaard | A61G 5/14 |
| 2013/0187356 A1 | 7/2013 | Hazeleger | |

* cited by examiner

*Primary Examiner* — Minnah L Seoh
*Assistant Examiner* — Harold Eric Pahlck, III
(74) *Attorney, Agent, or Firm* — Michele L. Lawson; Smith & Hopen, P.A.

(57) ABSTRACT

An assisted spring seat height optimization lift device and method of use thereof is presented herein. The device is generally comprised of a seat frame attached to a scissor lift assembly that can be moved by engaging a releases mechanism attached to a lifting mechanism. The device is used to lift a handcycle user to a height that is manageable to transfer to a wheelchair independently without impeding the functionality of the handcycle.

18 Claims, 10 Drawing Sheets

ASSISTED SPRING SEAT HEIGHT OPTIMIZATION LIFT

CROSS REFERENCE TO RELATED APPLICATIONS

This application is a nonprovisional of and claims priority to U.S. Provisional Patent Application No. 62/542,486, entitled "Assisted Spring Seat Height Optimization Lift", filed Aug. 8, 2017, the entire contents of which is herein incorporated into this disclosure.

FIELD OF INVENTION

This invention relates to devices to overcome vertical transfer distances between objects. Specifically, the invention provides an assisted lift mechanism to allow disabled individuals to independently overcome vertical transfer distances between two surfaces such as a handcycle and a wheelchair.

SUMMARY OF INVENTION

The company Top End built a fantastic hand cycle, keeping speed in mind. Sitting very low to the ground makes the cycle more aerodynamic. Although this design is great for speed, it creates a problem with transferring to and from the bike because of the height difference between the wheelchair and the bike seat. Normally, if someone were to independently transfer from a wheelchair to something else, the difference in height would be minute. If the height is too great to overcome, then the transfer would need to be assisted with either another person or some form of lift.

Given the difficulties in transferring to or from a low-profile hand cycle to a wheelchair or other horizontal surface, the inventors have developed an independent lift and associated method of transferring laterally to and from a hand cycle that is both lightweight and easy to use independently.

The design assists the user to get in and out of the hand cycle by reducing the height difference from the wheelchair to hand cycle seat. The design is generally comprised of a seat frame attached to a scissor lift assembly. A pair of handles is provided to support part of the user's body weight when the seat lift is being raised or lowered. A release mechanism attached to a locking gas spring placed on the assembly applies force to raise and lower the seat frame and lock it into position.

In an embodiment, a seat lift for a handcycle is presented comprising: a seat frame positioned beneath a seat; a scissor lift assembly attached to the seat frame on one end and to the handcycle at the opposing end; a pair of moveable handles attached to the handcycle on each side of the seat frame with the handles being capable of moving in a 180° arc; a release mechanism attached to one handle; and a lifting mechanism attached to the release mechanism. In some embodiments the lifting mechanism is a locking gas spring.

In some embodiments, the seat lift can have at least two lower sliders positioned on a pair of parallel lower slide rails attached to a bottom frame of the handcycle with the scissor lift assembly being attached to the at least two lower sliders and to a pair of clamps positioned behind the at least two lower sliders on the pair of parallel lower slide rails. A first threaded rod can connect the at least two lower sliders on the pair of parallel lower slide rails with a second threaded rod connecting the pair of clamps mounted on the pair of parallel lower slide rails. A pair of parallel upper slide rails can be attached below the seat frame with the scissor lift assembly being attached to the seat frame by a pair of sliders positioned on the pair of parallel upper slide rails.

A method of transferring from a lateral surface to a handcycle is also presented using a handcycle with a seat lift attached wherein the seat lift is designed as previously disclosed with a seat frame positioned beneath a seat; a scissor lift assembly attached to the seat frame on one end and to the handcycle at the opposing end; a pair of moveable handles attached to the handcycle on each side of the seat frame; a release mechanism attached to one handle; and a lifting mechanism attached to the release mechanism. In use, the seat lift is raised by engaging the release mechanism; a user slides into the seat of the handcycle from a transfer surface; the handles are in a forward position to allow the user to support part of the user's bodyweight; the release mechanism is engaged to lower the seat lift; and the handles are moved to a backward orientation to allow the user to use the handcycle. Once the user is done using the handcycle, the user can transfer out of the handcycle by moving the handles to a forward position; supporting part of the user's body weight on the handles; engaging the release mechanism to raise the seat lift to a determined height parallel with the transfer surface; and transferring from the seat lift to the transfer surface.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized, and structural changes may be made without departing from the scope of the invention.

Definitions

"Seat frame" as used herein refers to a frame positioned beneath a seat to support the seat to add stability. In some embodiments, the seat frame is comprised of 4 metal links having their ends attached together to be arranged in a square or rectangular shape which fits within the outer boundary of the seat to support the seat.

"Scissor lift assembly" as used herein refers to at least two pairs of metal links, for a total of four links, having opposing top and bottom ends, where one link is moveably attached to the other link by way of a pivot point at the center of each link. This pivot point may be an aperture in each link through which a pin is positioned to connect the two links but allow movement of the links relative to each other, similar to a pair of scissors. One pair of links is positioned on either side of the seat frame so that the top end of a first link is fixedly attached to the bottom front of the seat frame with the bottom end of the first link being fixedly attached to a bottom clamp on the lower sliding rail. The top end of the second link is fixedly attached to a slider on the upper sliding rail with the bottom end of the second link being attached to a slider on the lower sliding rail. The third and fourth links are positioned similarly on the opposing parallel sliding rails/opposing side of the seat frame.

"Longitudinal axis" as used herein refers to the axis along the longest side, in this case the side extending from the front of the handcycle to the rear of the handcycle.

"Front" as used herein refers to the orientation of the handcycle which is the most forward part that is normally viewed first when viewed straight on. Front is the direction one would face when seated on the handcycle.

"Back" or "rear" as used herein refers to the orientation of the handcycle which is the opposite direction from which one would face when seated on the handcycle.

"Lifting mechanism" as used herein refers to a mechanism which exerts a force to assist in lifting or lowering the seat. In some embodiments, the lifting mechanism can be a gas spring. In other embodiments, the lifting mechanism is a spring with a locking mechanism.

"Release mechanism" as used herein refers to a device which engages the lifting mechanism to exert the force necessary to lift or lower the seat. In some embodiments, the release mechanism may comprise a release button connected to a wire which is connected to the lifting mechanism, such as a gas spring.

Figure 1:
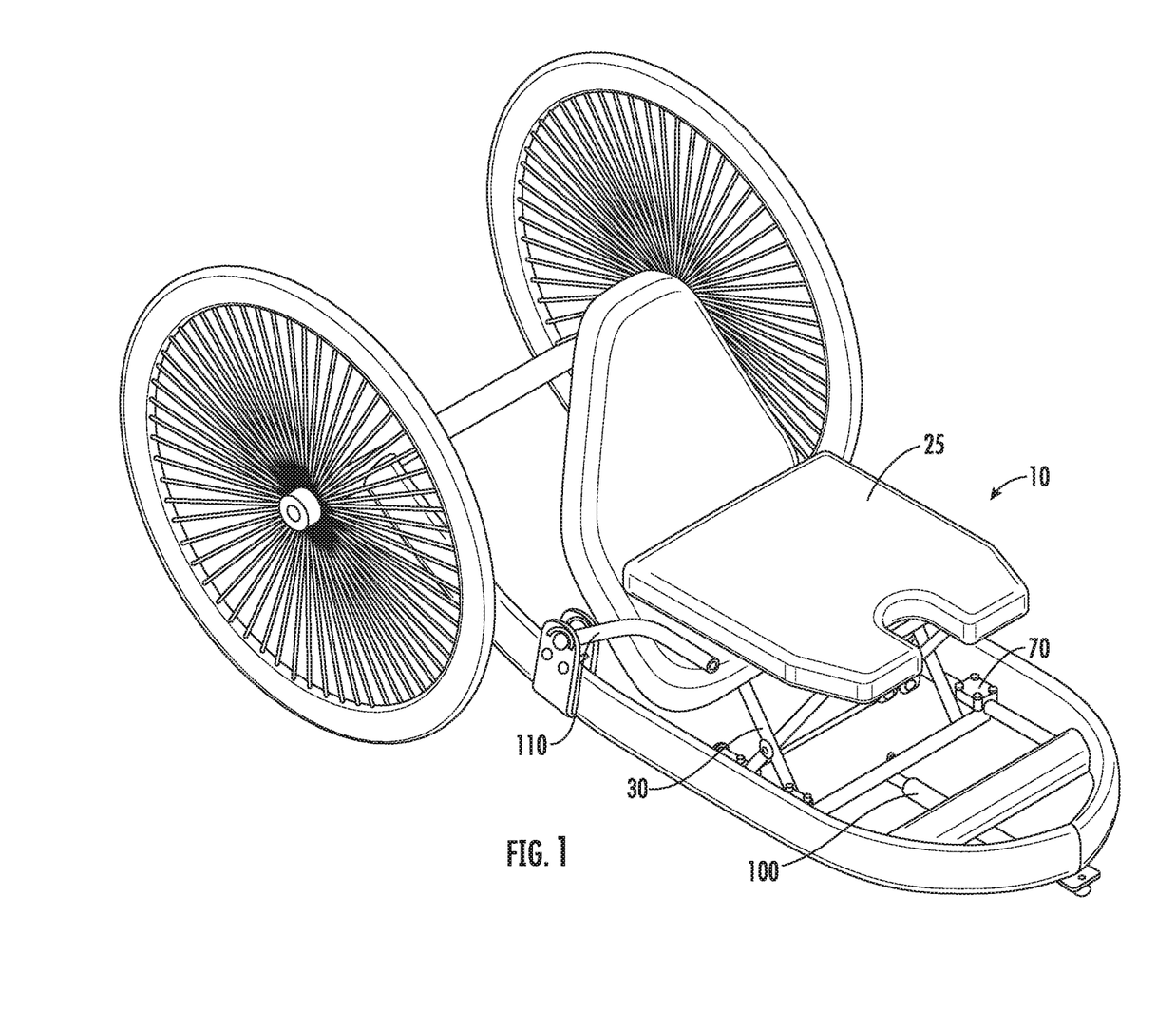
FIG. 1 is an image of the device attached to a handcycle.

As shown in FIG. 1, device 10 is generally comprised of seat frame 20 that is connected to scissor lift assembly 30 which allows seat 25 to move both upwards and downwards as well as back and forth. Handles 110 are positioned on either side of the seat 25 to provide stability to the user when transferring in or out of seat 25.

Figure 2:
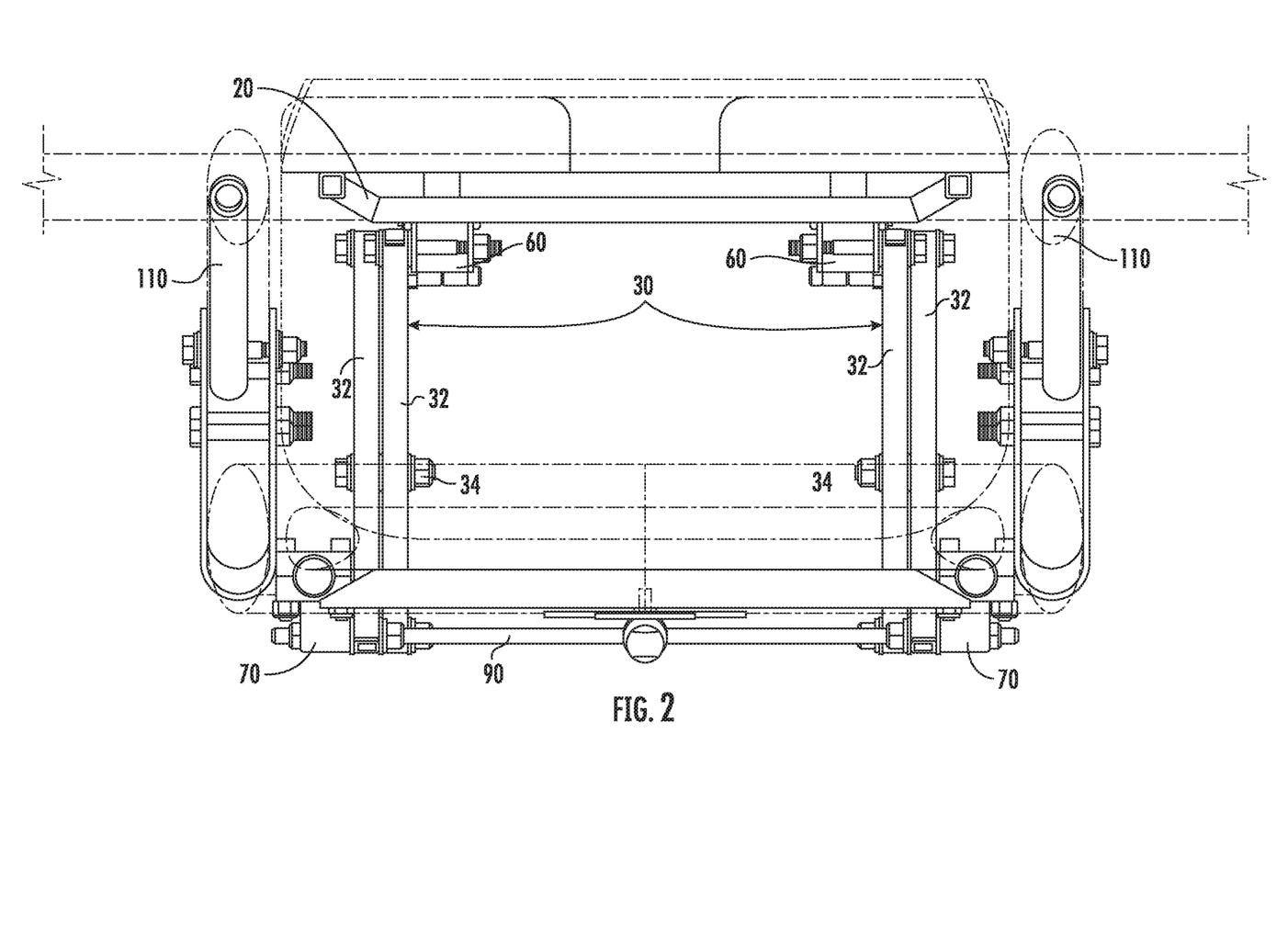
FIG. 2 is a front view of the device attached to a handcycle.
Figure 3:
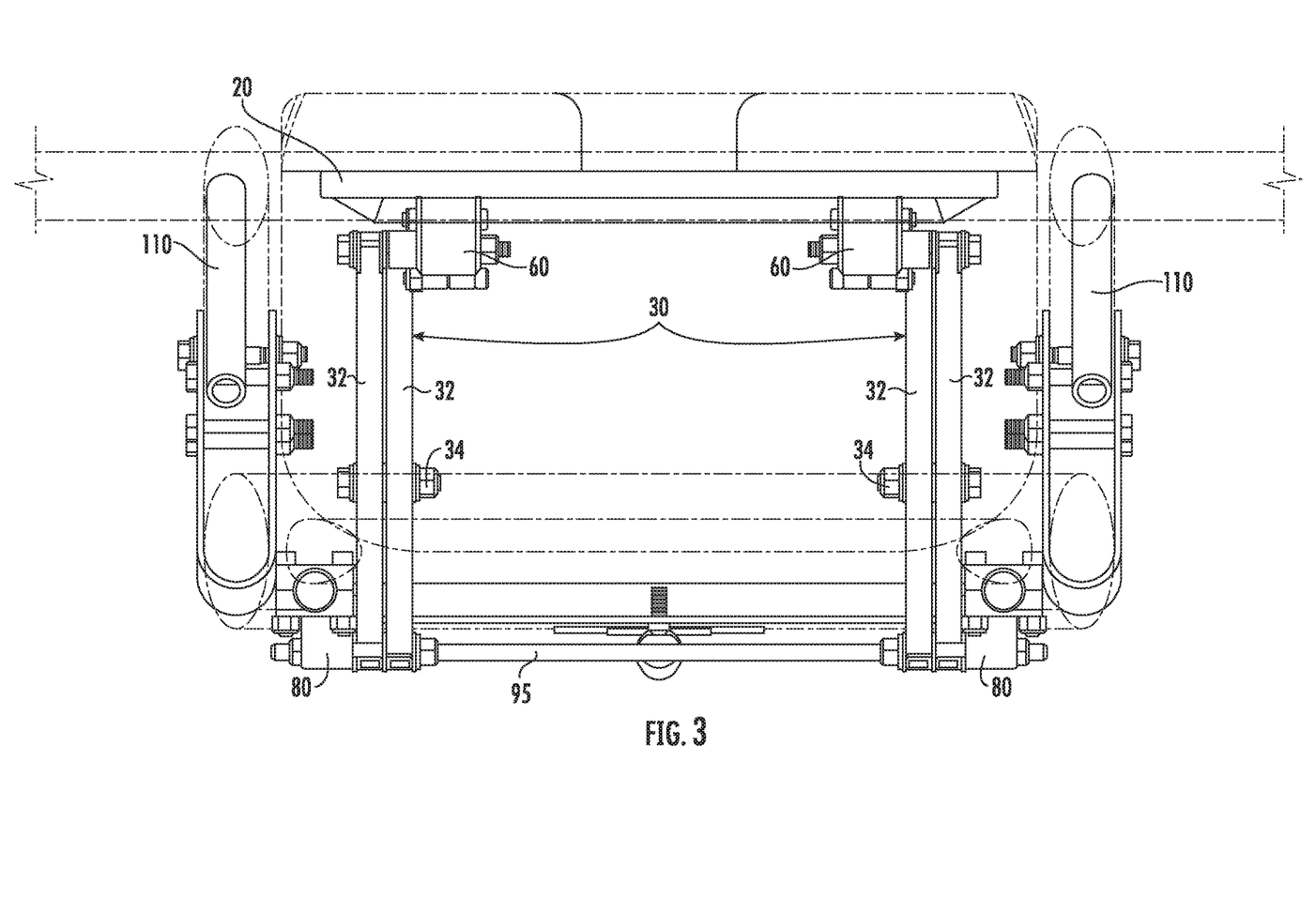
FIG. 3 is a back view of the device attached to a handcycle.

FIGS. 2 and 3 are front and rear views, respectively, of the scissor lift assembly. As shown in the front view of FIG. 2, front rod 90 is shown connecting lower sliders 70, each of which is attached to a bottom end of one of links 32 which comprise scissor lift assembly 30. Each pair of links 32 are moveably connected via pivot point 34 to allow scissor lift assembly 30 to move after activation by lifting mechanism 100 to raise and lower seat 25. Upper sliders 60 are shown attached to the opposing end of one of each pair of links 32 which are attached to lower sliders 70.

As shown in the rear view of FIG. 3, rear rod 95 connects clamps 80, each of which is attached to a bottom end of one of links 32 which comprise scissor lift assembly 30. Top end of each link 32 is fixedly attached to seat frame 20.

Figure 4:
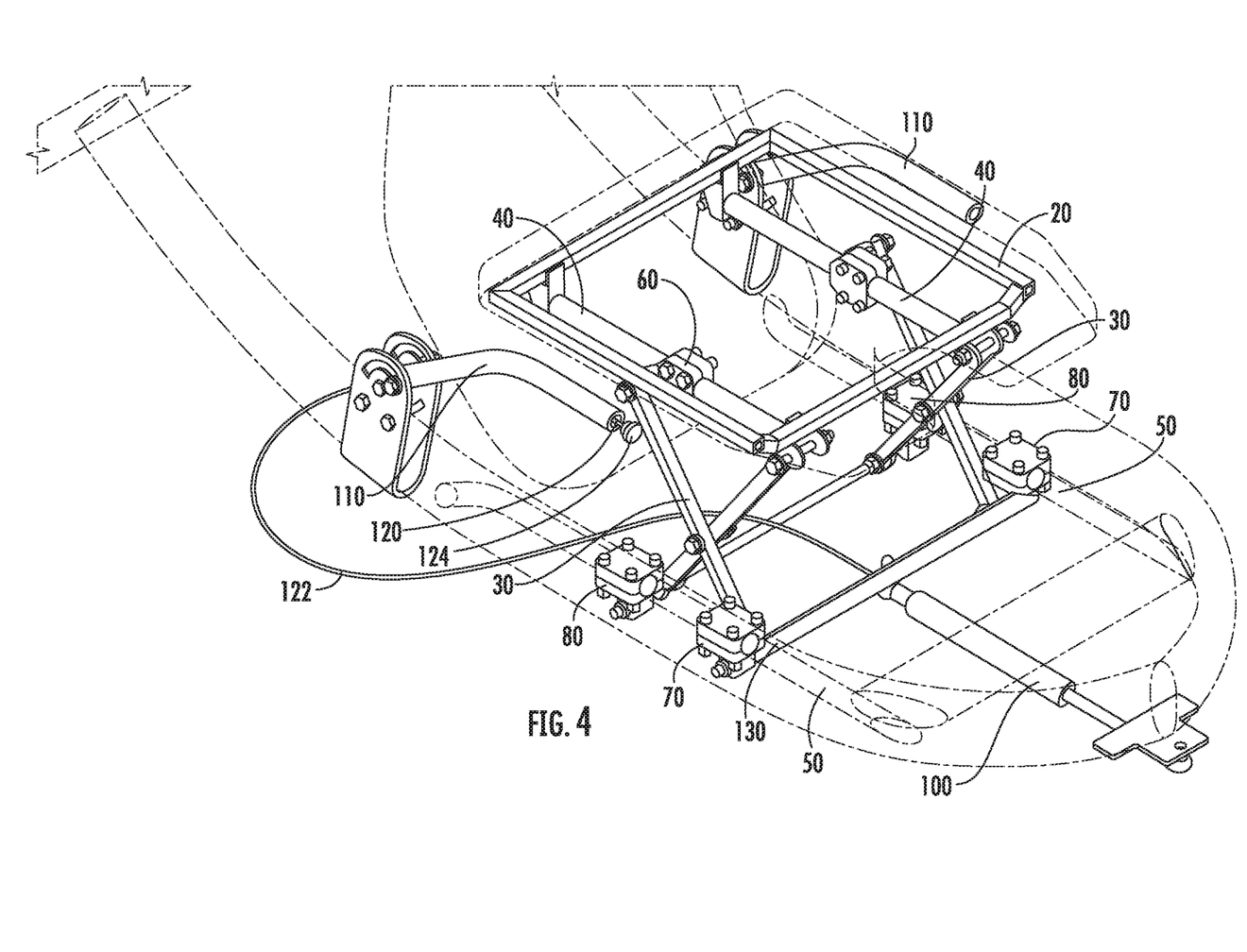
FIG. 4 is a front perspective view of the device attached to a handcycle.
Figure 5:
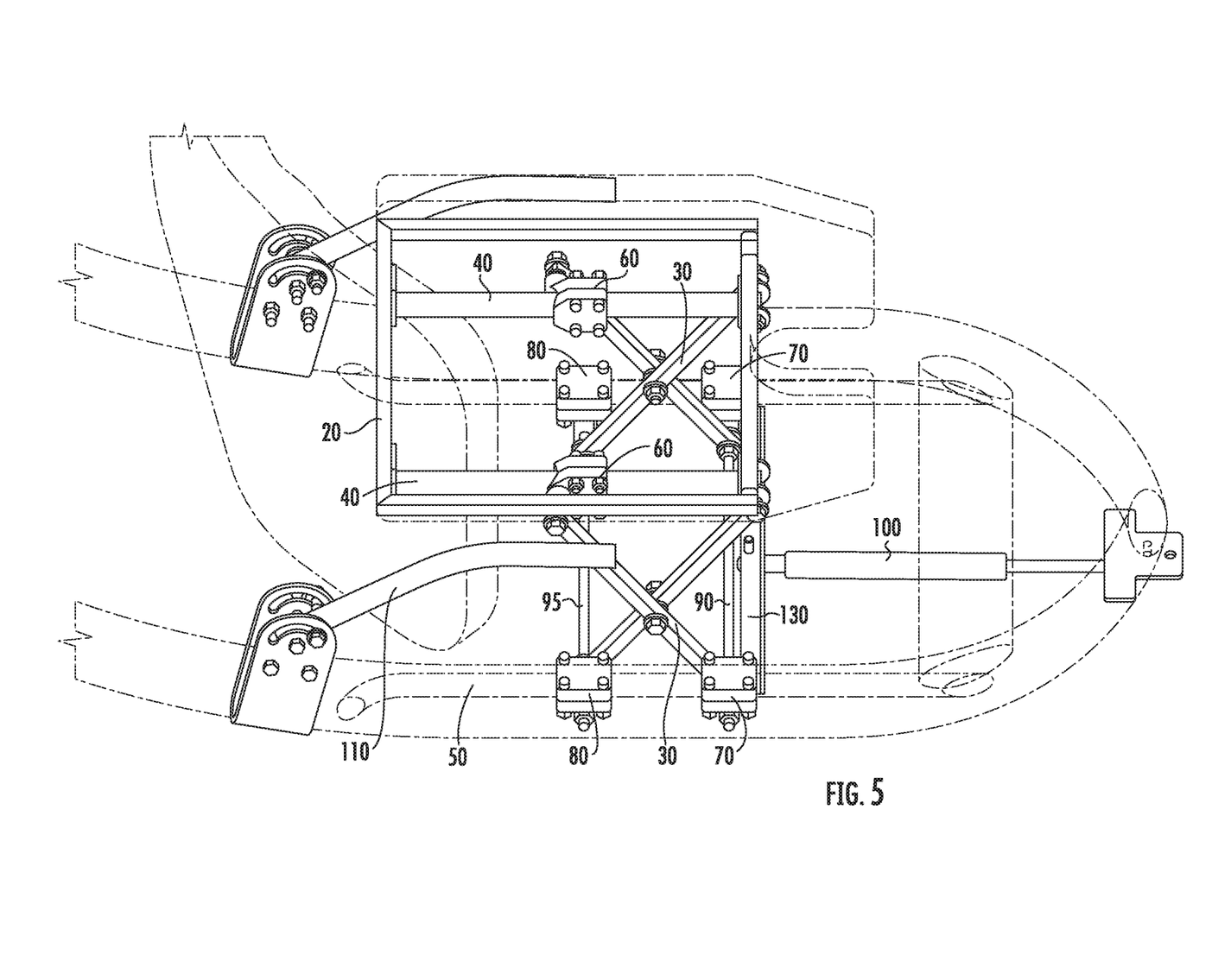
FIG. 5 is a top perspective view of the device attached to a handcycle.

As shown in FIGS. 4 and 5, seat frame 20 attaches to scissor lift assembly 30 to raise and lower seat 25. Seat frame 20 provides structure and stability to seat 25. The outline of seat frame 20 is made of four metal links (front, back, and opposing sides) arranged in a square or rectangular shape. Two parallel upper slide rails 40 are fixedly attached to seat frame 20 along a longitudinal axis. Parallel upper slide rails 40 are attached slightly below and within the plane of the outline of seat frame 20 with one end of each upper slide rail 40 being attached to the front link of the seat frame and the opposite end of each upper slide rail 40 being attached to the back link of seat frame 20. One upper slider 60 is mounted on each upper sliding rail 40 thus providing upper sliders 60 a smooth surface to slide along when scissor lift assembly 30 is engaged.

A pair of lower slide rails 50, each oriented parallel to a longitudinal axis, are positioned at bottom of the handcycle. In some embodiments, the existing seat rails of the handcycle may be used as lower slide rails 50. In other embodiments where the existing framework of the handcycle is not suitable to use as lower slide rails 50, each lower slide rail 50 may be fixedly attached to an interior side of the handcycle frame via bolted on anchors. Lower slider 70 is positioned at the front end of each lower slide rail 50 and clamp 80 is positioned at the back end of each lower slide rail 50. Front threaded rod 90 connects each lower slider 70 to the other and rear threaded rod 95 connects each clamp 80 to the other. This configuration positions the front rod 90 and the rear rod 95 perpendicular to the parallel lower slide rails 50 that are aligned with the longitudinal axis and assists in keeping the device square and preventing twisting/binding thus enabling the system to have rigidity.

Many different styles of sliders and clamps are contemplated as this does not affect the functionality but more the size and fit to the mechanism. Upper sliders 60, lower sliders 70 and clamps 80 have the same general shape of a two-part housing with a large orifice extending through the middle from one side to the opposing side. The orifice surrounds lower slide rails 50 to mount clamp 80 to the lower slide rails 50. In an embodiment, lower sliders 70 and clamps 80 are similarly shaped with the difference being the inner diameter of the largest orifice of clamps 80 having a tighter tolerance with lower slide rails 50. The smaller diameter orifice allows clamp 80 to grip lower slide rail 50 so that it is immovable. Lower sliders 70 have a slightly larger clearance on the inner diameter of the orifice as well as a nylon insert to allow for reduced friction when moving along lower slide rails 50. Four apertures are positioned at the corners of the sliders/clamps with bolts passing therethrough to secure the two halves of clamp 80 or lower sliders 70 body together. Upper sliders 60 are mounted similarly on upper slide rails 40 with the 4 smallest apertures being used for bolts to secure the two halves of upper sliders 60 together. There is a hole at the bottom of clamp 80 and lower sliders 70 which is threaded to align front rod 90 with lower sliders 70 and rear rod 95 with clamps 80.

Scissor lift assembly 30 is comprised of four metal links 32 with each link 32 having outer apertures which serve to connect links 32 to upper sliders 60, lower sliders 70 or clamps 80. Each link 32 has a middle aperture used to connect two links 32 together via a pin. This middle aperture is positioned slightly below the center of each link 32 to generate additional range of motion despite the limited stroke of lifting mechanism 100. The pin should allow the pair of links 32 to move freely with the motion of scissor lift assembly 30.

Scissor lift assembly 30 has opposing sides with each side being comprised of a pair of links 32 with one link 32 being pinned to a fixed point on the front of seat frame 20 on one end and a fixed point on clamp 80 on the other end. A second link 32 is pinned to upper slider 60 and lower front slider 70. This scissor configuration allows seat 25 to move rearward as it moves upwards by applying a horizontal force to lower front sliders 70. This is done without interfering with the hand cycle controls. Seat frame 20 remains horizontal throughout the range of motion. In some embodiments, links 32 of scissor lift assembly 30 can be made of aluminum. The size and material were chosen to withstand the load applied on the seat.

Seat 25 moves upwards and downwards as well as from front to back to adjust horizontally for different comfort positions. Moving seat 25 backwards allows seat 25 to stay flush with a transfer surface that is angled behind seat 25 which minimizes pinch points.

Lifting mechanism 100 provides lift assist to the user. Preferably lifting mechanism 100 incorporates or can be paired with a locking mechanism. In some embodiments, a locking gas spring is used which locks seat 25 in any position and provides lift assist to the user. It is crucial for lifting mechanism 100 to have or be paired with a locking mechanism that allows the user to be able to lock lifting mechanism 100, and thus seat 25, into a raised position that is comfortable for transfer.

Figure 6:
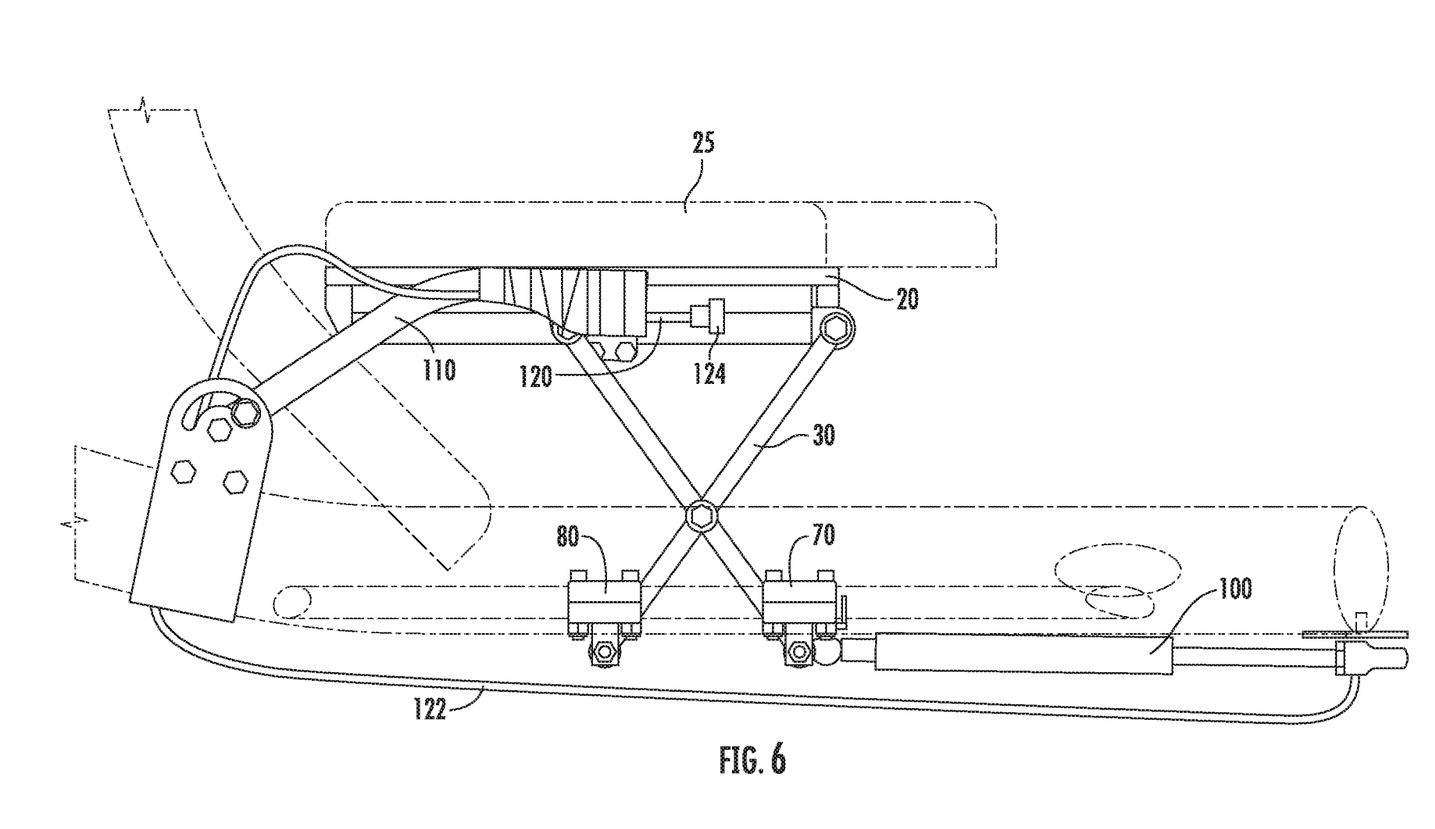
FIG. 6 is a side view of the device attached to a handcycle.
Figure 7A:
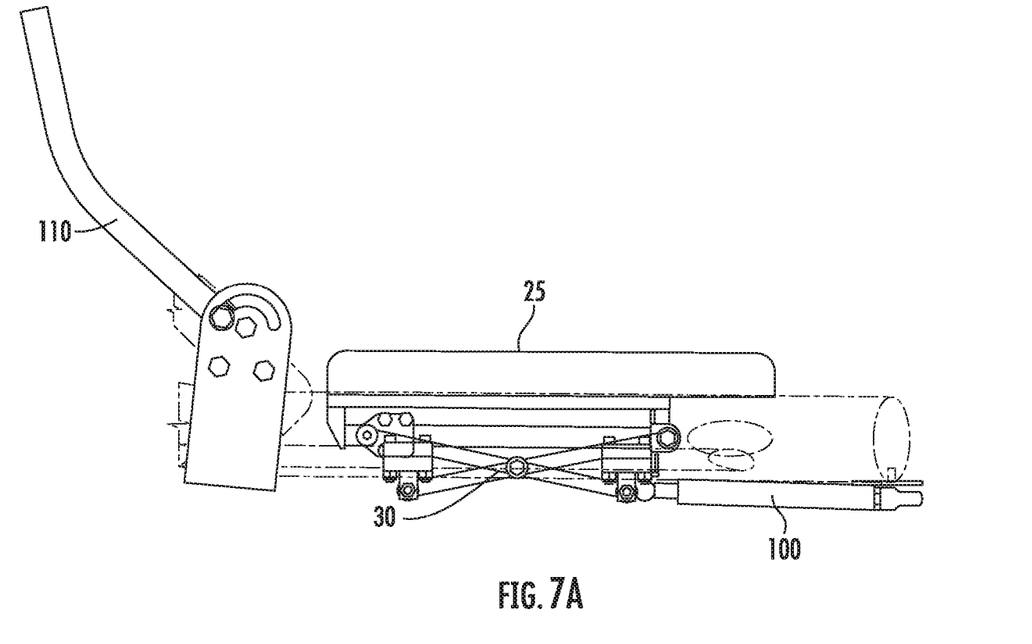
FIG. 7A-B is a side view of the device in which (A) scissor lift assembly in lowered position and (B) scissor lift assembly in upright position.
Figure 7B:
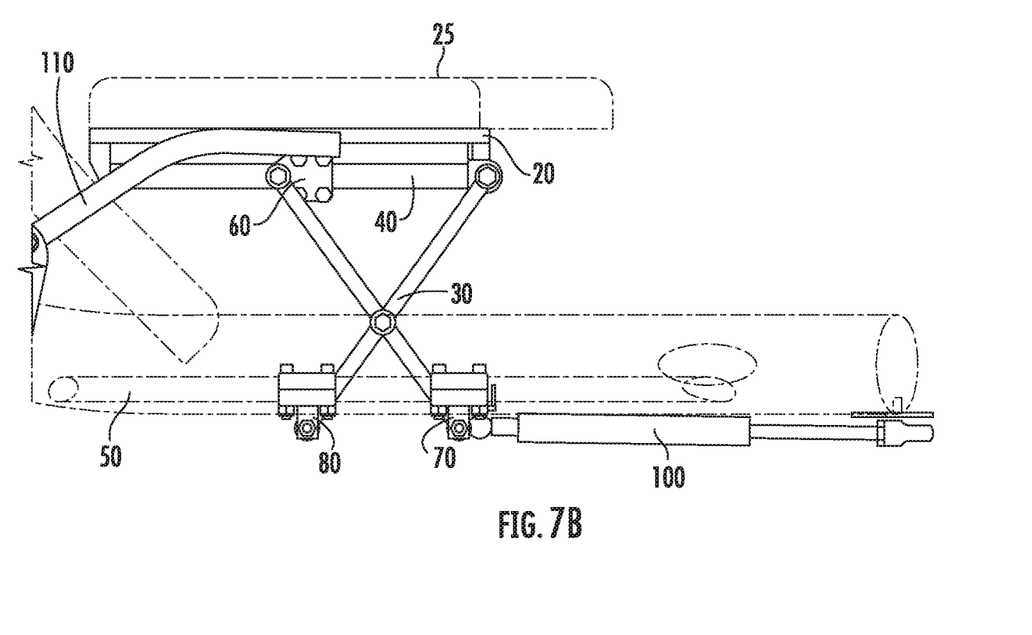
Figure 8:
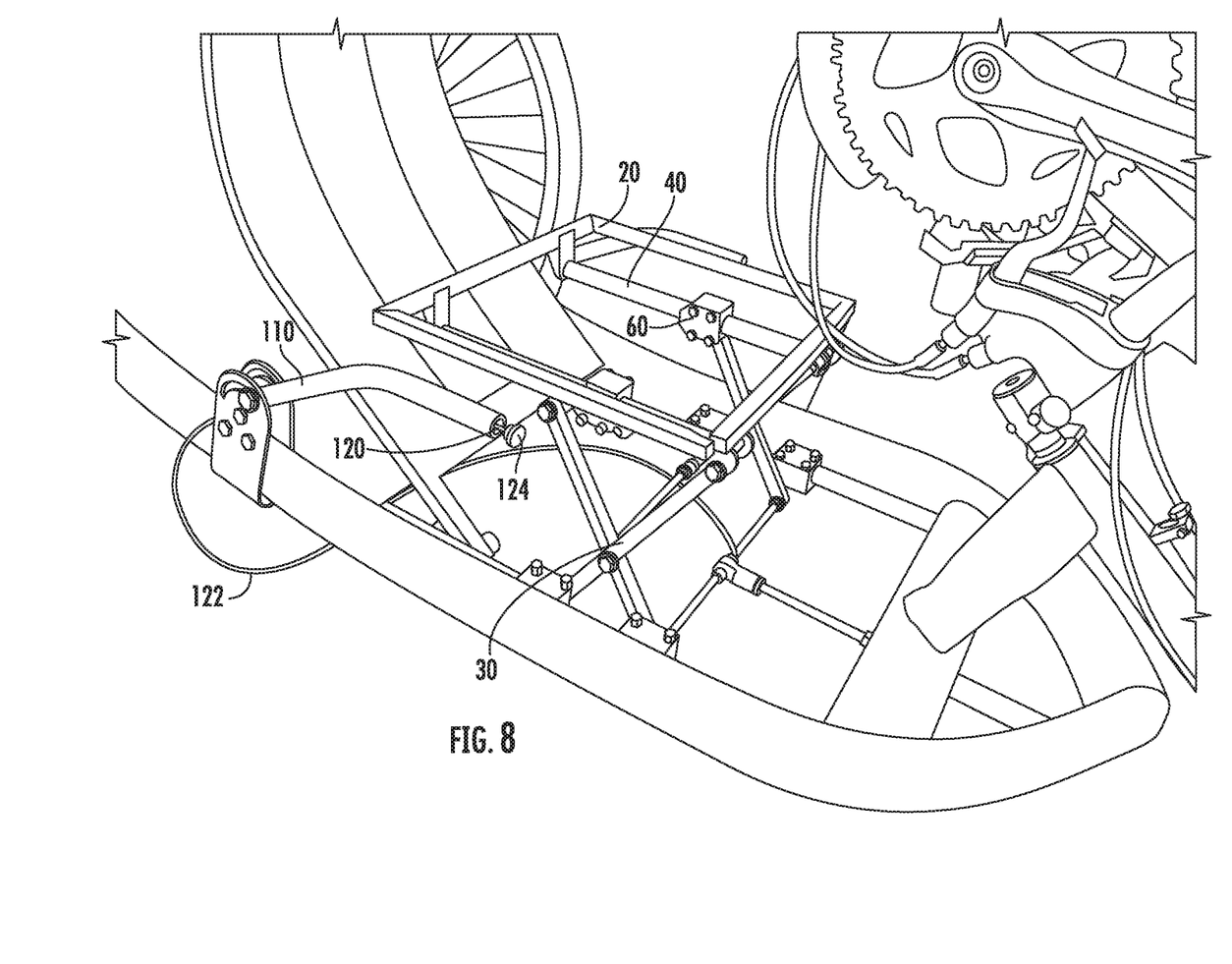
FIG. 8 is a perspective view of the device on the body of a handcycle without the seat.

FIG. 6 is a side view of device 10 depicting attachment of lifting mechanism 100 to release mechanism 120 with scissor lift assembly 30 in a raised position. FIG. 7A depicts scissor lift assembly 30 in a lowered position while FIG. 7B depicts scissor lift assembly 30 in a raised position to allow a user to transfer in and out of seat 25. FIG. 8 depicts a perspective view of device 10 with front wheel of handcycle attached to handcycle frame.

Figure 9:
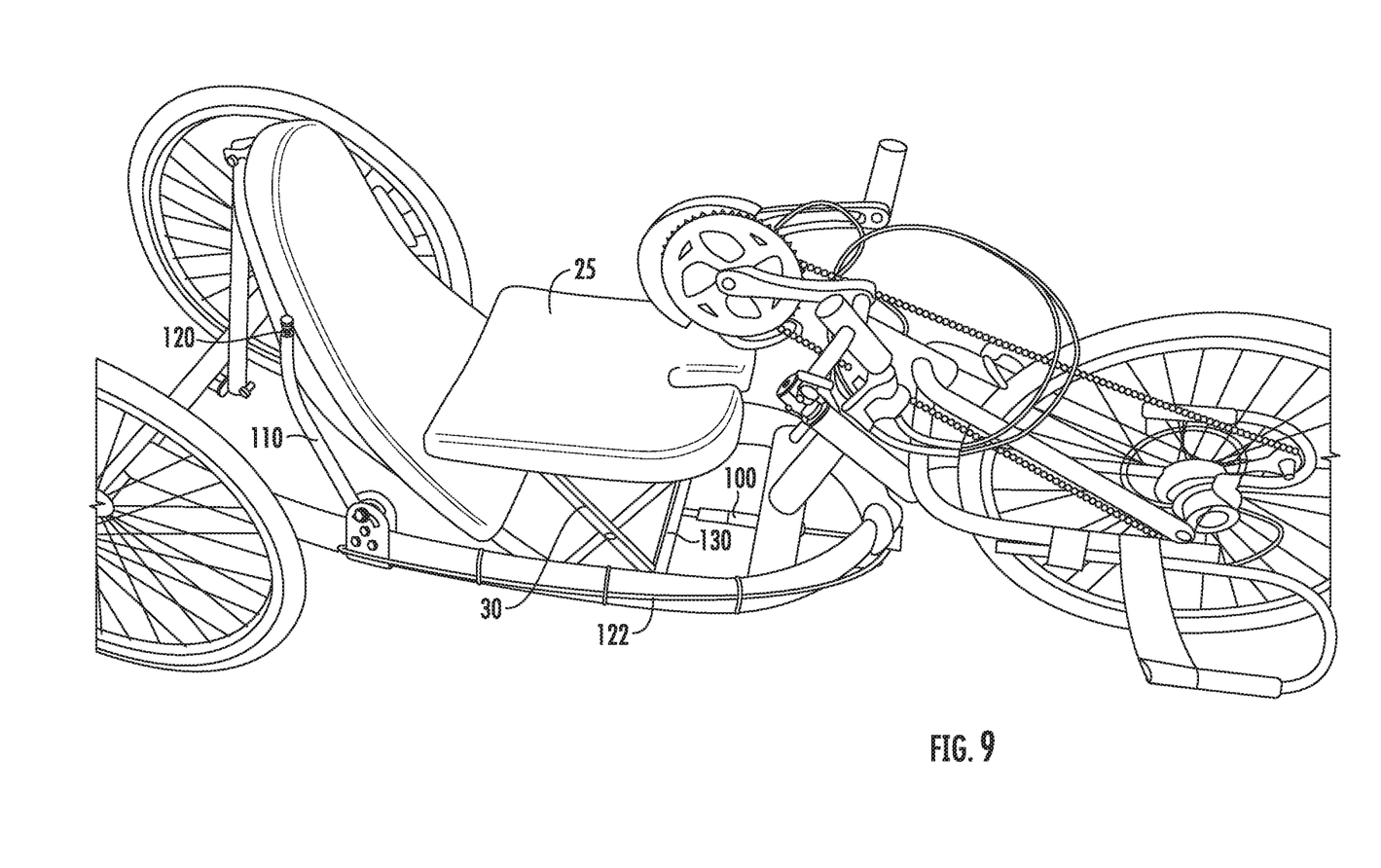
FIG. 9 is a top perspective view of the device on a handcycle in the raised position.
Figure 10:
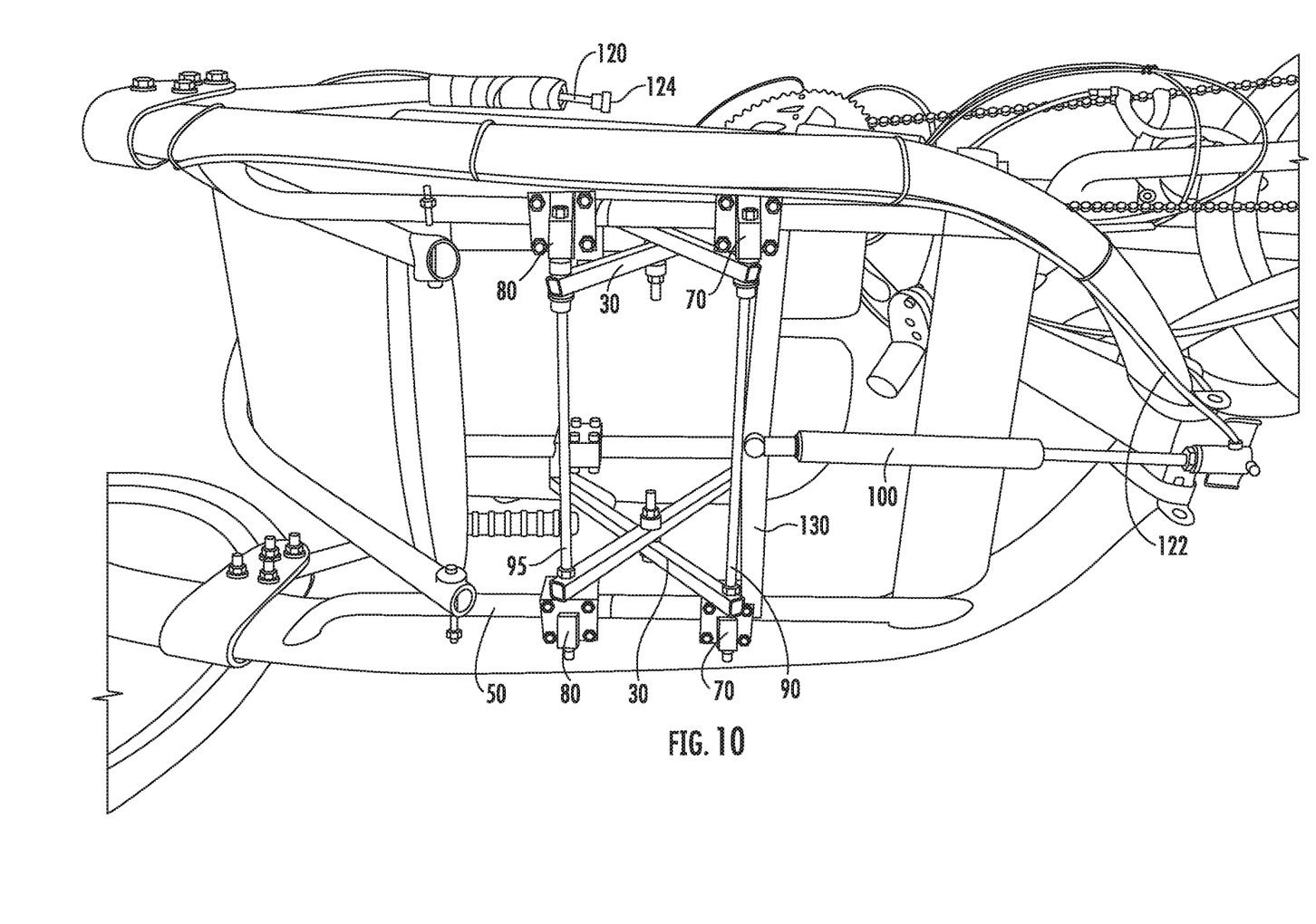
FIG. 10 is a bottom perspective view of the device.

As depicted in FIGS. 9 and 10, angled bar 130 is positioned anterior to front rod 90. Lifting mechanism 100 can be attached to the center of angled rod 130 or bolted to front rod 90 for added stability. In some embodiments, a strong metal such as steel can be used for angled bar 130 in order to provide enough strength and rigidity to support the load of lifting mechanism 100. Lifting mechanism can be attached to angled rod 130 on one end and to the handcycle on the other end.

Release mechanism 120 extends from lifting mechanism to release button 124. Release mechanism can be comprised of wire 122 which extends from lifting mechanism 100 to one of handles 110 to terminate at release button 124 which allows the user to easily adjust lifting mechanism 100 with the push of a button. In embodiments in which lifting mechanism is a locking gas spring, release mechanism 120 controls the gas spring to give complete control to the user as well as making seat 25 easy to position. Release mechanism 120 can be externally attached to one handle 110 or alternatively can extend through one handle 110 so that release button 124 protrudes from the open end of one handle 110.

Device 10 is adjustable for different weights but in embodiments using a locking gas spring, there is a minimum weight limit. If the user is too light, seat 25 will not move downwards. Adjustability is achieved by replacing the gas spring with one of a higher or lower force. Because device 10 is not intended to lift the entire weight of the user, the standard locking gas spring works with users of a broad weight range. A heavier user may wish to use a gas spring with a higher force to provide greater lifting assistance but doing so is not a requirement. The minimum weight limit results from the fact that the user's weight must be greater than the vertical force exerted by the spring in order to compress the locking gas spring and lower seat 25. In an example, the locking gas spring used could require a minimum of 100 lbs. to lower, however it should be noted that this value would be different with a spring of different force. The only upper limit to weight is the material strength of the components.

In an alternative embodiment, an adjustable spring with a separate locking mechanism may be employed as the lifting mechanism 100. The locking gas spring provides lifting force and locks the mechanism into place, however if a gas spring was determined to be unsuitable for a particular application, it could be replaced with a different lifting mechanism including, but not limited to, a coil spring and ratcheting latch.

Handles 110 are positioned on either side of seat 25 and are used as a support to raise/lower the weight of the user, since the gas spring does not provide enough force to lift the entire weight of the user. In some embodiments, handles 110 may be made of aluminum or other light metal. In some embodiments, a hand grip can be added to handles to allow for added comfort to the user. Handles 110 can be positioned in the forward orientation for raising and lowering seat 25. Handles 110 can be moved to fold back out of the way into a backwards orientation when the handcycle is in use or when the user is transferring into or out of the handcycle. Handles 110 may be faced backwards and seat 25 located in a raised position to allow the user to transfer from a surface to the handcycle. Once the user is sitting in the handcycle, the user would use handles 110 for support in lifting part of his/her body weight slightly out of seat 25 while simultaneously pressing release button 124 thus engaging release mechanism 120 and lifting mechanism 100 to lower seat 25. Once seat 25 is in a lowered position and the user is seated comfortably, handles 110 may be moved to a backwards orientation to move them out of the way of the user during cycling. When the user is ready to transfer out of the handcycle, he/she would move handles 110 to the forward position and use them for support to lift part of their body weight up while simultaneously pressing the release button 124 to engage release mechanism 120 and lifting mechanism 100 to raise seat 25.

Handles 110 can be attached to the handcycle via a bolted-on anchor. The anchor also keeps handles 110 in a locked position as to add stability. In the event that handles 110 are mounted such that they cause interference with seat 25, the handle design can be modified to add a compound bend to handles 110 to position them farther from seat 25 and eliminate any interference with seat 25. A larger diameter tubing on handles 110 allows release mechanism 120 to be mounted inside the tubing for a more compact design. Handles 110 may be able to lock in different positions on the 180° arc formed from movement of handles 110 from a forward position to a backwards position. It is important to note that any time the user releases release mechanism 120 in handle 110, seat 25 stops at that height for safety. For example, if the user's hand slips off release button 124, seat 25 will lock at that position thus preventing seat 25 from collapsing unexpectedly and causing injury to the user.

In some embodiments, the weight of the user is supported by the gas spring at all times. In other embodiments, a bump-stop mechanism can be added to transfer the weight of the user to the frame of the handcycle while in the lowered position. A rubber stop mechanism can be utilized in the lowered position to take the weight off the gas spring and transfer it directly to the frame. This stop mechanism would provide a bit of a shock absorber thus resulting in a more comfortable ride for the user.

The device is lightweight and completely bolted on which keeps the user from having to modify the handcycle frame. Keeping the seat lift separate from the backrest allows the user to maintain adjustability of the backrest for comfort. The foldaway handles give the user a stable surface to lift themselves up and then fold out of the way to prevent hitting them with their arms while cycling. When in the lower position, the gas spring provides some shock absorption for a more comfortable ride.

While aluminum is very lightweight, an even lighter material such as carbon fiber could be used to further reduce the weight of the device. Welding the attachment points to the frame rather than using a bolt-on device can further reduce the weight, while sacrificing the benefits of a bolt-on kit. There are several advantages of the bolt-on kit including, but not limited to, ease of manufacturing; ability to retrofit older handcycles; lower cost; and reversibility. With regard to the ease of manufacturing, the manufacturer can build a standard frame and offer the elevating seat as an option that bolts onto that frame which allows the manufacturer to avoid producing a different frame for a handcycle with the elevating seat. With regard to retrofitting older handcycles, given that handcycles are very expensive, allowing a user to purchase an elevating seat kit, as opposed to a whole new handcycle, and install it on their current handcycle saves the user quite a bit of money. Installation of the bolt-on kit requires only a few wrenches which allows the user to purchase the kit and install it themselves rather than paying a shop to cut and weld the frame. With regard to reversibility, a bolt-on kit requires no permanent modifications to the handcycle frame. If the user no longer wants to use the elevating seat, they can easily restore the handcycle to its original state by unbolting the seat kit. This is also beneficial if the user likes the elevating seat for casual riding but does not want the additional weight in a competitive event. Rather than purchasing two different handcycles, the user can remove the seat for a race and then reinstall it for casual riding.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described.

What is claimed is:

1. A seat lift for a handcycle comprising:
   a seat frame positioned beneath a seat;
   a scissor lift assembly attached to the seat frame on one end and to the handcycle at an opposing end;
   a pair of moveable handles attached to the handcycle on each side of the seat frame wherein the pair of moveable handles are capable of movement in a 180° arc;
   a release mechanism attached to one handle; and
   a lifting mechanism attached to the release mechanism.

2. The seat lift of claim 1, further comprising at least two lower sliders positioned on a pair of parallel lower slide rails attached to a bottom frame of the handcycle.

3. The seat lift of claim 2, wherein the scissor lift assembly is attached to the at least two lower sliders and to a pair of clamps positioned behind the at least two lower sliders on the pair of parallel lower slide rails.

4. The seat lift of claim 3, further comprising a first threaded rod connecting the at least two lower sliders on the pair of parallel lower slide rails.

5. The seat lift of claim 4, further comprising a second threaded rod connecting the pair of clamps mounted on the pair of parallel lower slide rails.

6. The seat lift of claim 1, further comprising a pair of parallel upper slide rails attached below the seat frame.

7. The seat lift of claim 6, wherein the scissor lift assembly is attached to the seat frame by a pair of sliders positioned on the pair of parallel upper slide rails.

8. The seat lift of claim 1, wherein the lifting mechanism is a locking gas spring.

9. A method of transferring from a lateral surface to a handcycle comprising:
   providing a handcycle with a seat lift attached wherein the seat lift comprises:
      a seat frame positioned beneath a seat;
      a scissor lift assembly attached to the seat frame on one end and to the handcycle at an opposing end;
      a pair of moveable handles attached to the handcycle on each side of the seat frame;
      a release mechanism attached to one handle; and
      a lifting mechanism attached to the release mechanism;
   raising the seat lift by engaging the release mechanism;
   sliding into the seat of the handcycle;
   using the pair of handles to support part of a user's bodyweight;
   engaging the release mechanism to lower the seat lift; and
   moving the handles to a backward orientation to use the handcycle.

10. The method of claim 9, further comprising:
    moving the handles to a forward position;
    supporting part of the user's body weight on the handles;
    engaging the release mechanism to raise the seat lift to a determined height parallel with the transfer surface; and
    transferring from the seat lift to the transfer surface.

11. The method of claim 9, wherein the seat lift further comprising at least two lower sliders positioned on a pair of parallel lower slide rails attached to a bottom frame of the handcycle.

12. The method of claim 11, wherein the scissor lift assembly is attached to the at least two lower sliders and to a pair of clamps positioned behind the at least two lower sliders on the pair of parallel lower slide rails.

13. The method of claim 12, further comprising a first threaded rod connecting the at least two lower sliders on the pair of parallel lower slide rails.

14. The method of claim 13, further comprising a second threaded rod connecting the pair of clamps mounted on the pair of parallel lower slide rails.

15. The method of claim 9, further comprising a pair of parallel upper slide rails attached below the seat frame.

16. The method of claim 15, wherein the scissor lift assembly is attached to the seat frame by a pair of sliders positioned on the pair of parallel upper slide rails.

17. The method of claim 9, wherein the lifting mechanism is a locking gas spring.

18. The method of claim 9, wherein the handles are capable of movement in a 180° arc.

\* \* \* \* \*